United States Patent
Haruna et al.

(10) Patent No.: US 7,917,590 B2
(45) Date of Patent: *Mar. 29, 2011

(54) DELETING MECHANISM IN SIP MULTIMEDIA SERVICES

(75) Inventors: Adamu Haruna, Accra North (GH); Arto Leppisaari, Kangasala (FI)

(73) Assignee: Nokia Corporation, Espoo (FI)

(*) Notice: Subject to any disclaimer, the term of this patent is extended or adjusted under 35 U.S.C. 154(b) by 533 days.

This patent is subject to a terminal disclaimer.

(21) Appl. No.: 11/685,667

(22) Filed: Mar. 13, 2007

(65) Prior Publication Data

US 2007/0286164 A1   Dec. 13, 2007

Related U.S. Application Data

(60) Provisional application No. 60/781,771, filed on Mar. 13, 2006.

(51) Int. Cl.
- G06F 15/16 (2006.01)
- H04L 12/66 (2006.01)
- H04J 3/06 (2006.01)

(52) U.S. Cl. ......... 709/206; 709/227; 370/352; 370/503

(58) Field of Classification Search ................. None
See application file for complete search history.

(56) References Cited

U.S. PATENT DOCUMENTS

| | | | |
|---|---|---|---|
| 6,611,836 B2 * | 8/2003 | Davis et al. | 707/10 |
| 2001/0009883 A1 * | 7/2001 | Couturier et al. | 714/4 |
| 2005/0055416 A1 | 3/2005 | Heikes et al. | |
| 2005/0267942 A1 * | 12/2005 | Quinn et al. | 709/206 |
| 2006/0168467 A1 * | 7/2006 | Couturier et al. | 714/4 |
| 2007/0078935 A1 * | 4/2007 | Garcia-Martin et al. | 709/206 |

FOREIGN PATENT DOCUMENTS

| | | | |
|---|---|---|---|
| EP | 1372316 A1 | | 12/2003 |
| KR | 20060084327 | * | 7/2006 |
| WO | WO 2005/121991 | | 12/2005 |

OTHER PUBLICATIONS

Jennings et al., "Relay Extensions for Message Sessions Relay Protocol (MSRP) draft-ietf-simple-msrp-relays-02.txt", Oct. 2004.*
Sparks, "RFC 3515", Apr. 2003.*
OMA-TS-IM_Simple. Draft version 1.0, open mobile alliance (OMA), Jan. 19, 2006, retrieved from the internet: http://member.openmobilealliance.org/ftp/public_documents/mwg/IM/Permanent_documents/See sections 4.1-4.3 and 6.1.5.

(Continued)

*Primary Examiner* — Wen-Tai Lin
(74) *Attorney, Agent, or Firm* — Ditthavong Mori & Steiner, P.C.

(57) ABSTRACT

A method of deleting an item from a user account in a SIP multimedia environment. When an item such as an instant message is to be deleted, a SIP REFER message is transmitted from a user device to delete the item from the user account, with the message including a unique identifier for the item. In response to the transmitted request, an SIP INVITE session is established between a virtual agent and a network-based deleted items location. After the SIP INVITE session is established, the item is transferred from the user account to the network-based deleted items location and is deleted from the user account.

23 Claims, 4 Drawing Sheets

OTHER PUBLICATIONS

Campbell et al., Session initiation protocol (SIP) extension for instant messaging. RFC 3428, Dec. 2002. See section 3 and abstract.

Aduma, Deleting Stored Messages, Change Request, Apr. 4, 2006, retrieved from the internet: http://member,openmobilealliance.org/ftp/public_douments/mwg/IM/2006/ See chapter 6.

International Search Report for PCT Application PCT/IB2007/000604.

Korean Office Action for corresponding KR Application No. 10-2008-7026800, Dec. 5, 2009, Korea.

Australian Office Action of corresponding AU App. No. 2007232195 dated May 17, 2010, pp. 1-2.

Australian Office Action of corresponding AU App. No. 2007232195 dated Sep. 13, 2010, pp. 1-2.

Mexican Office action for corresponding MX app. No. MX/a/2008/012811 dated Aug. 6, 2010, pp. 1-3.

* cited by examiner

US 7,917,590 B2

DELETING MECHANISM IN SIP MULTIMEDIA SERVICES

FIELD OF THE INVENTION

The present invention relates generally to session initiation protocol (SIP) services and SIP for instant messaging and presence leveraging extensions (SIMPLE) services. More particularly, the present invention relates to SIP/SIMPLE based services such as instant messaging (IM) and push-to-talk (poC) services.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Open Mobile Alliance (OMA) is a standards body which collectively develops open standards for use in the mobile industry. The OMA helps to create interoperable services enablers to work across countries, operators and mobile terminals and is driven by market requirements. To expand the mobile market, companies supporting the Open Mobile Alliance work to aid in the rapid and wide development and deployment of a variety of new, enhanced mobile information, communication and entertainment services.

The OMA is currently developing IM services based on SIP, Message Session Relay Protocol (MSRP) and Extensible Markup Language (XML) Configuration Access Protocol (XCAP) protocols developed by the International Engineering Task Force (IETF) SIMPLE working group. Instant Messaging service are already deployed using several proprietary technologies and Wireless Village specifications.

There is currently a need for a deleting Mechanism in the SIP multimedia service environment. In an http environment, if a document needs to be deleted, an "http delete" command is simply issued. However, there is currently no corresponding deleting feature or function defined for the SIP environment. In fact, even SIP extensions for services have not defined such a feature. In current multimedia services, particularly OMA SIP/SIMPLE IM, there are several requirements about storing and retrieving messages. Although there is a need for deleting and selectively deleting stored messages, such a mechanism has yet to be defined.

SUMMARY OF THE INVENTION

The present invention comprises a novel deleting mechanism for use in SIP multimedia services. The present invention involves the use of various SIP multimedia service environment features for this purpose. In one embodiment, a "recycle bin" is defined in the network and is associated with a SIP uniform resource identifier. Messages that are stored within the network are assigned a unique identifier. If a user desires to delete the message, he or she requests that a SIP/MSRP function be set up between the message and the network-defined recycle bin. When processed, the message is transferred to the recycle bin, leaving the user's account in the user's mail storage server.

The system and method of the present invention is simple and easy to adopt, as already-existing defined tools such as the SIP REFER method, Virtual User Agent and SIP URI are used.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention comprises a novel deleting mechanism for use in SIP multimedia services. The present invention involves the use of various SIP multimedia service environment features for this purpose. In one embodiment, a "recycle bin" or similar location for deleted items is defined in the network and is associated with a SIP uniform resource identifier. Messages that are stored within the network are assigned a unique identifier. If a user desires to delete the message, he or she requests that a SIP/MSRP session function be set up between the message and the network-defined recycle bin. When processed, the message is transferred to the recycle bin, leaving the user's account in the user's mail storage server.

Figure 1:
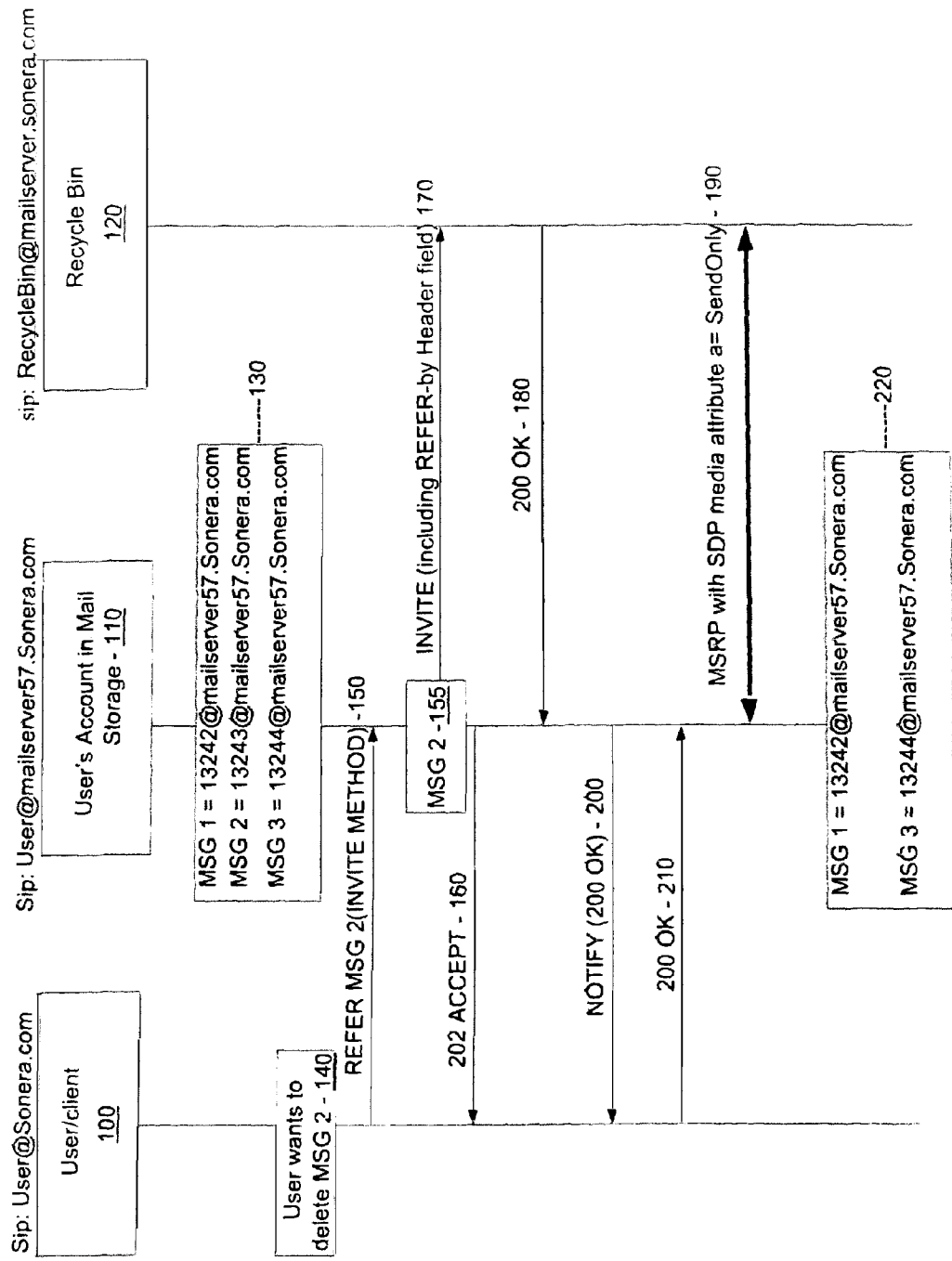
FIG. 1 is a flow chart showing the operation of a deleting mechanism for SIP multimedia services in accordance with one embodiment of the present invention.

FIG. 1 is a flow chart showing the operation of a deleting mechanism for SIP multimedia services in accordance with one embodiment of the present invention. In particular, FIG. 1 shows the interaction among a user/client device 100, a user's account in mail storage 110 and a recycle bin 120 as defined herein. Both the user's account 110 and the recycle bin 120 are located remote from the user/client device. In the embodiment shown in FIG. 1, the SIP URI for the user/client device is "User@Sonera.com." The SIP URI for the user's account is "User@mailserver57.Sonera.com." The SIP URI for the recycle bin is "RecycleBin@mailserver.sonera.com."

As discussed above, stored messages in the network are assigned unique message identifiers. Three such messages are shown at 130 in FIG. 1 with identifiers of "13242@mailserver57.Sonera.com" (MSG 1) "13243@mailserver57.Sonera.com" (MSG 2) and "13244@mailserver57.Sonera.com" (MSG 3).

At 140 in FIG. 1, a user decides he or she wants to delete MSG 2. At this point, the user/client device 100 sends an SIP REFER with INVITE request 150 to the message identifier 13243@mailserver57.Sonera.com, which serves as a virtual user agent 155, at the user's account 110. The SIP REFER request has the network-based recycle bin address (RecycleBin@mailserver.sonera.com) in the Refer-to header. The SIP REFER with INVITE request 150 serves to request that a SIP Session be set up with the network-based recycle bin 120 (RecycleBin@mailserver.sonera.com). The virtual user agent 155 responds by accepting the SIP REFER request from the user/client device 100 with a "202 ACCEPT" message at 160. The virtual user agent 155 also sends an INVITE request to set up a SIP session with the recycle bin 120 at 170. The recycle bin 120 accepts this session at 180. At 190, an SIP session is officially set up with the virtual user agent 155 in the form of a message session relay protocol (MSRP), with the session description protocol (SDP) media attribute set to a=SendOnly. The virtual user agent 155 proceeds to notify the user/client 100 of the SIP session at 200, and the user/client device 100 acknowledges this notification at 210. In the SIP/MSRP session, MSG 2 is sent from the user's account 110 to the network-based recycle bin 120, causing MSG 2 to disappear from the user's account 110. After successful transmission of the message MSG2, the SIP session between the virtual user agent 155 and the recycle bin 120 is torn down. The end result, depicted at 220, is the presence of only MSG 1 and MSG 3 in the user's account 110 in the user's mail storage server.

In an alternative embodiment of the present invention, the functions of the user's account 110 and the recycle bin 120 are collocated. In this situation, the sending of an INVITE request to set up a SIP session 170, the acknowledgement of this request 180, and the setting up of the SIP session with MSRP 190 is not necessary.

Figure 2:
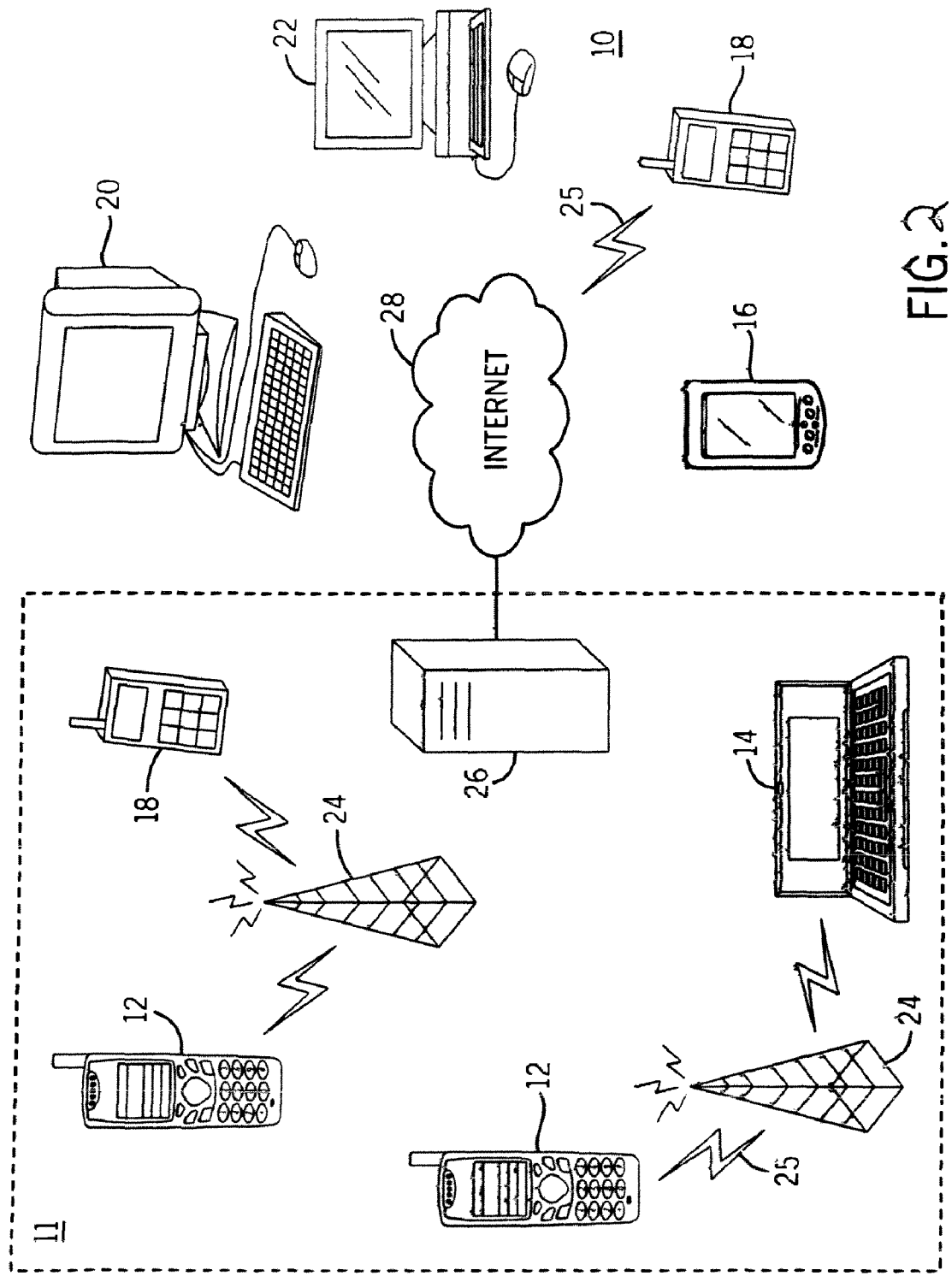
FIG. 2 is an overview diagram of a system within which the present invention may be implemented.

FIG. 2 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 2 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

Figure 3:
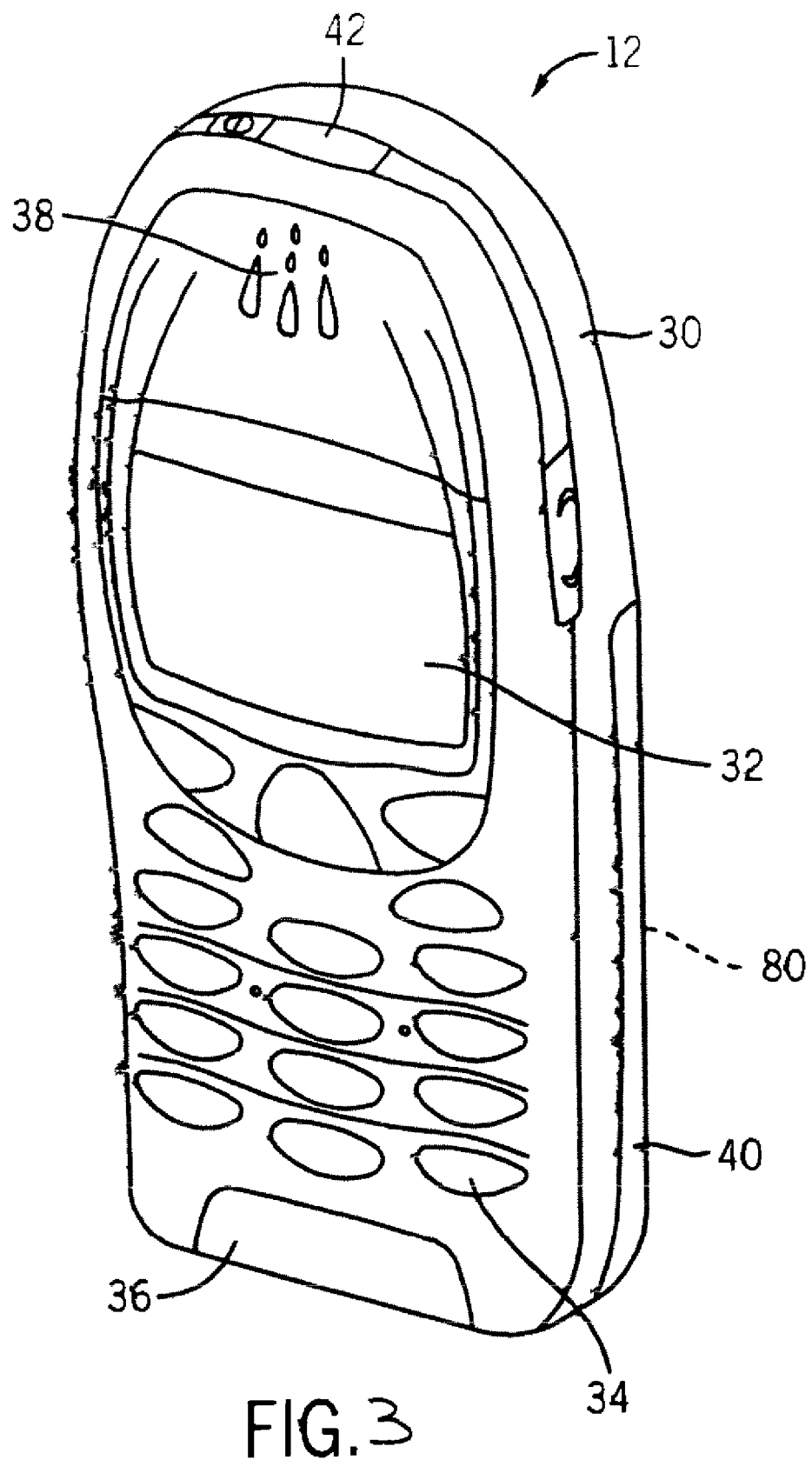
FIG. 3 is a perspective view of a mobile telephone that can be used in the implementation of the present invention.
Figure 4:
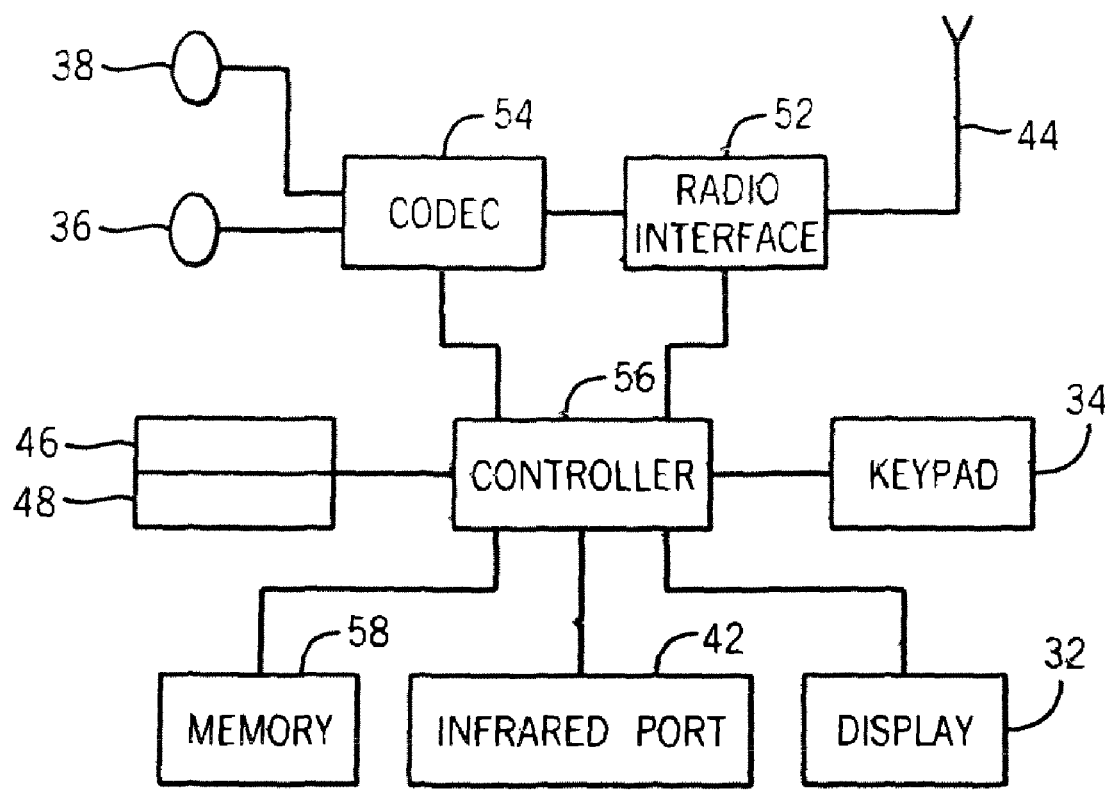
FIG. 4 is a schematic representation of the telephone circuitry of the mobile telephone of FIG. 2.

FIGS. 3 and 4 show one representative mobile telephone 12 within which the present invention may be implemented. It should be understood, however, that the present invention is not intended to be limited to one particular type of mobile telephone 12 or other electronic device. Other types of electronic devices that may be used include, but are not limited to, a PDA 16, a combination PDA and mobile telephone 14, an IMD 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc.

The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones. For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of deleting an item from a user account in a session initiation protocol (SIP) multimedia environment, comprising the following computer-implemented steps:
receiving a request from a user device to delete the item from the user account, the request comprises an SIP REFER request including a unique identifier for the item to be deleted;
determining to establish a SIP session with a remote recycle bin; and
after establishing the SIP session, determining to transfer the item from the user account to the remote recycle bin for automatic deletion without transfer of the item to a local recycle bin.

2. The method of claim 1, wherein the SIP REFER request includes an address for the remote recycle bin in its Refer-to header.

3. The method of claim 1, further comprising, in response to receiving the request, determining to transmit an acknowledgment of the request to the user device.

4. The method of claim 1, wherein the SIP session is established with a session description protocol (SDP) directional attribute set to a=SendOnly.

5. The method of claim 1, wherein the item includes a unique message identifier, and wherein the unique message identifier is included in the request from the user device.

6. The method of claim 1, wherein the user device, the user account and the remote recycle bin each possess a unique uniform resource identifier.

7. The method of claim 1, wherein message session relay protocol (MSRP) is used to transfer the item from the user account to the remote recycle bin.

8. A non-transitory computer-readable medium carrying one or more instructions for deleting an item from a user account in a session initiation protocol (SIP) multimedia environment, which, when executed by one or more processors, cause an apparatus to at least perform the following steps:
- receiving a request from a user device to delete the item from the user account, the request comprises an SIP REFER request including a unique identifier for the item to be deleted;
- determining to establish a SIP session with a remote recycle bin; and
- after establishing the SIP session, determining to transfer the item from the user account to the remote recycle bin for automatic deletion without transfer of the item to a local recycle bin.

9. The non-transitory computer-readable medium of claim 8, wherein the SIP REFER request includes an address for the remote recycle bin in its Refer-to header.

10. The non-transitory computer-readable medium of claim 8, wherein the SIP session is established with a session description protocol (SDP) directional attribute set to a=SendOnly.

11. The non-transitory computer-readable medium of claim 8, wherein the item includes a unique message identifier, and wherein the unique message identifier is included in the request from the user device.

12. The non-transitory computer-readable medium of claim 8, wherein the user device, the user account and the remote recycle bin each possess a unique uniform resource identifier.

13. The non-transitory computer-readable medium of claim 8, wherein message session relay protocol (MSRP) is used to transfer the item from the user account to the remote recycle bin.

14. An electronic device, comprising:
- at least one processor; and
- at least one memory including computer program instructions,
- the at least one memory and the computer program instructions configured to, with the at least one processor, cause the apparatus to perform at least the following:
  - receive a session initiation protocol (SIP) request from a user device to delete an item from a user account, the request comprises an SIP REFER request including a unique identifier for the item to be deleted;
  - determine to establish a SIP session with a remote recycle bin; and
  - after establishing establish the SIP session, determine to transfer the item from the user account to the remote recycle bin for automatic deletion without transfer of the item to a local recycle bin.

15. The electronic device of claim 14, wherein the SIP REFER request includes an address for the remote recycle bin in its Refer-to header.

16. The electronic device of claim 14, wherein the SIP session is established with a session description protocol (SDP) directional attribute set to a=SendOnly.

17. The electronic device of claim 14, wherein the item includes a unique message identifier, and wherein the unique message identifier is included in the request from the user device.

18. The electronic device of claim 14, wherein message session relay protocol (MSRP) is used to transfer the item from the user account to the remote recycle bin.

19. A method of deleting an item from a user account in a session initiation protocol (SIP) multimedia environment, comprising the following computer-implemented steps:
- determining to transmit a request from a user device to delete the item from the user account, the request comprises a SIP REFER request including a unique identifier for the item to be deleted;
- in response to the transmitted request, determining to establish a SIP session between a virtual user agent and a remote recycle bin; and
- after establishing the SIP session, determining to transfer the item from the user account to the remote recycle bin for automatic deletion without transfer of the item to a local recycle bin.

20. The method of claim 19, wherein the SIP session is established with a session description protocol (SDP) directional attribute set to a=SendOnly.

21. The method of claim 19, wherein the SIP REFER request includes an address for the remote recycle bin in its Refer-to header.

22. The method of claim 19, wherein message session relay protocol (MSRP) is used to transfer the item from the user account to the remote recycle bin.

23. A method of deleting an item from a user account in a session initiation protocol (SIP) multimedia environment, comprising the following computer-implement steps:
- determining to transmit a SIP REFER request from a user device to delete the item from the user account, the SIP REFER request including an address for a remote recycle bin in its Refer-to header and unique identifier for the item to be deleted, wherein the item is transferred to the remote recycle bin for automatic deletion without transfer of the item to a local recycle bin; and
- in response to receiving the SIP REFER request, determining to transmit an acknowledgment of the request to the user device.

\* \* \* \* \*